3,305,303
CHROMIC CHLORIDE PRODUCTION
Winslow H. Hartford, Manlius, and Ernest B. Hoyt, Geddes, N.Y., assignors to Allied Chemical Corporation, New York, N.Y., a corporation of New York
No Drawing. Filed Oct. 28, 1964, Ser. No. 407,234
16 Claims. (Cl. 23—87)

This invention relates to manufacture of chromium compounds, and more particularly to a new and improved process for producing anhydrous chromic chloride from chromium oxide.

A number of methods for producing chromic chloride have been proposed. However, chromic chloride has remained a material which in the past has been prepared with considerable difficulty, even on a laboratory or limited pilot plant scale. For example, it is known that chromic chloride may be prepared by passing chlorine gas over ferrochrome or chromium metal at high temperatures.

In recent years the expanding use of chromic chloride has made this material of increasing importance for manufacture of catalysts and organic compounds of chromium.

Chromic oxide is a relatively low cost starting material from which chromic chloride may be produced. No satisfactory process for making suitable chromic chloride from chromic oxide has, however, been proposed.

An object of the present invention is to provide a new and improved process for producing chromic chloride.

Another object of the invention is to provide a practical and efficient process for producing chromic chloride from chromic oxide.

A further object is to provide a process for production of chromic chloride from chromic oxide utilizing chlorine and carbon to produce anhydrous chromic chloride of low carbon content and high purity.

Other objects and advantages will be evident from the following description of the invention.

It has been found in accordance with the present invention that high purity chromic chloride may be produced in the presence of carbon, by subjecting chromic oxide to reaction in the fluidized state with a gas containing at least a 10% excess of chlorine and with carbon having particle size at least about 5 times greater than the particle size of the chromic oxide, the rate of gas flow being regulated to provide a superficial velocity between 60–400% above the incipient fluidization velocity of the fluidized mass, preferably a superficial velocity between 80–200%, at a temperature regulated above about 920° C., preferably between 925° C. to 960° C., to convert the chromic oxide by reaction with the chlorine and carbon to volatile chromic chloride, and recovering high purity chromic chloride.

The process of the present invention produces chromic chloride by reaction of chromic oxide with chlorine and carbon under carefully controlled specific conditions in the fluidized state. The chromic chloride product is of high purity with carbon content controlled at a desired low level. Ordinarily, a fluidized reaction state would be avoided when it is desired to produce chromic chloride free of any substantial amounts of the solid reactants, such as carbon, because of carryover of the reactants in contaminating amounts in the gas stream exiting the fluidized bed along with the volatile product. However, by employing substantially larger carbon particles relative to the chromic oxide in the presence of excess chlorine under controlled velocity conditions, the chromic chloride produced is of high purity with at most only negligible amounts of carbon present in the product. So effective is the control of the carbon problem in the present invention that it has been found that an excess of carbon may be employed in the reaction zone and several additional benefits obtained in operation of the process. The excess of carbon employed may be substantial and it has been further found that at least a portion of the excess carbon may be actually consumed within the reaction zone by combustion with oxygen to supply heat internally to the reaction without adversely affecting carbon content of the product. When excess carbon is employed a portion of the carbon after residence in the reaction zone may be withdrawn therefrom and it has been found that carbon may be withdrawn from the reaction zone in various embodiments of the invention to obtain further benefits contributing to the production of high purity chromic chloride.

In carrying out the invention for production of chromic chloride a carefully proportioned and sized mixture of carbon and chromic oxide is subjected to the action of chlorine gas in the fluidized state at a temperature above about 920° C. The process is preferably carried out in a fluidized bed reactor which may be of the conventional type having gas feed inlet in the lower portion and discharge outlet in the upper portion to withdraw vapors of chromic chloride product. The chromic oxide employed in the process should be of high purity and essentially free of other chloride forming metals such as iron, aluminum, and magnesium which would result in contamination of the product. The chromic oxide employed may be prepared by any suitable procedure such as by reaction of sodium dichromate and sulfur. Chromic oxide may also be prepared by reaction of sodium dichromate solution with reducing agents and calcination of the resulting hydrous oxide. The chromic oxide may be in any desired form including granular and also the more finely divided pigment grades depending largely on desired particle size of the chromic oxide. The chromic oxide and carbon preferably in intimate admixture may be charged to the reactor at any convenient location and thus both top and bottom feeding may be employed. The rate of feed of gas and solids to the fluidized bed is desirably such that equilibrium occurs between the fluidized bed of reactants and the product so that the volatile chromic chloride product is quantitatively formed and liberated from the fluidized reactor in the exit gas stream. The chromic chloride product may be readily recovered by condensation by known procedures in virtually pure condition from the exit vapor stream.

An essential condition in carrying out the process of the present invention is control of the relative size of the chromic oxide starting material and carbon. It has been found that the use of carbon of substantially greater particle size than that of the chromic oxide is an important factor contributing to the production of anhydrous chromic chloride of low carbon content. In operation of the process, the particle size of the carbon in the feed mixture should be at least about 5 times greater than the particle size of the chromic oxide. During the reaction the larger carbon particles slowly depreciate in size and will eventually reach the point where the lighter weight depreciated particles are subject to carryover along with the volatile product exiting the reactor. However, by supplying the carbon requirement in the form of larger particles the number of particles eventually depreciated and subject to carryover is very little compared to the chromic chloride product. Thus, it will be evident that actual particle size of the feed materials is not so important as is the relative size between the chromic oxide and carbon. As a practical matter, the carbon is usually supplied in the form of coke having a particle size such that the coke is within the range of about 3 to about 80 standard mesh, desirably about 5–40 standard mesh.

Corresponding particle size of the chromic oxide charged to the reactor in the more practical modes of operation is usually smaller than about 50 standard mesh, and commonly between about 60 to 325 standard mesh. Chromic oxide having particle size in the micron range may also be employed with very satisfactory results in practice of the invention. It is desirable that a fairly close control over the size distribution of the coke be maintained to assure uniform operation and good results. Control of the size distribution of the chromic oxide is somewhat less important and a fairly wide range of particle sizes may be used in make-up of the solids mixture fed to the bed. Thus, even some larger chromic oxide particles not satisfying the indicated 5 to 1 relationship may be included in the mixture up to an amount of say about 20% of the chromic oxide. It is of course desired that the average particle size of the chromic oxide satisfy the 5 to 1 relationship.

Another important factor in carrying out the invention is the use of an excess of chlorine over the amount theoretically required to convert the chromic oxide to chromic chloride. Several factors have been found to require an excess of chlorine in order to obtain satisfactory results in carrying out the invention. Unless chlorine is present in excess there is some tendency toward incomplete conversion of the chromic oxide with resultant formation of chromous chloride which has been found to fuse within the bed and interfere with the reaction. An excess of chlorine also favors the formation of chromium tetrachloride which increases the apparent volatility of the chromium from the reaction mass. Of particular significance is the fact that an excess of chlorine also apparently favors the more exothermic conversion of the chromic oxide to chromic chloride with the formation of by-product carbon dioxide. Generally, a chlorine excess of about 10% over the stoichiometric amount to produce chromic chloride based on a carbon dioxide by-product is required to give satisfactory results. The upper limit of the amount of chlorine which may be used is less important and the excess employed may be as much as 100%, and even higher. A chlorine excess of about 10–50% has been found to give best results under preferred operating conditions.

In carrying out the invention it is important to maintain the reaction temperature above about 920° C. Below a temperature of about 920° C. it has been found that undesirable side reactions take place in the fluidized bed causing formation of oxychlorides and other chloride impurities. A reaction temperature above 920° C. has also been found important to produce a chromic chloride product of desired low hygroscopicity. The upper limit of the reaction temperature in the fluidized reaction zone is not particularly critical and mostly a matter of economy and temperature limitation of the particular materials employed in construction of the reactor. Temperatures in the reaction zone may therefore range up to as high as about 1100° C., and even somewhat higher. Particularly good results are obtained when the reaction temperature is regulated within the lower range temperatures of about 925–960° C.

Control of the velocity of the gases employed to maintain fluidization within the reaction mass is also important in successful production of high purity chromic chloride by the process of the invention. As a general proposition the rate of flow of gas through the solids mass of carbon and chromic oxide is regulated at a value as low as practical. As the larger carbon particles in the fluidized mass depreciate during reaction the carbon will eventually become of such light weight that the particles will exit the reaction zone along with the chromic chloride product. At the lower gas velocities slightly above that required for fluidization of the reaction mass the critical size of the carbon particles has been found to be desirably small permitting extended residence and reaction of the carbon in the zone and the production of chromic chloride of low carbon content as the use of the larger carbon particles makes only a limited number of particles available to find their way into the product. The actual or real velocity of the gas employed in operation of the process will vary depending on several factors including the amount and size of the carbon particles employed, weight of the total solids in the bed, diameter and construction of the reactor and density of the fluidizing gas. However, for any given set of conditions there is an incipient superficial velocity at which the solids mass will commence fluidization. In general, chromic chloride of desired low carbon content may be produced by the process of the invention when the superficial gas velocity is maintained at a level above the incipient fluidization velocity by about 60–400%. Above a superficial velocity of about 400% of the incipient fluidization velocity the tendency for carbon to be present in the product rapidly increases. Particularly good results are obtained at a superficial velocity about 80–200% above the incipient fluidization velocity. An empirical method of determining the size of the carbon and gas velocities to obtain a high purity chromic chloride is given by the following formula:

$$\frac{d_1^3}{d_2^3} \times \frac{\text{lb. coke consumed}}{\text{lb. CrCl}_3 \text{ produced}} \times 100 = C$$

wherein $d_1$ is the critical diameter at which carbon is carried over with the chromic chloride product, $d_2$ is the diameter of the carbon in the solids mixture fed to the reaction zone, and C the approximately percentage of carbon in the chromic chloride product. The parameter $d_1$ may be approximated by the formula:

$$d_1^2 = \frac{18NV}{g(P-P_0)}$$

wherein N is the viscosity of the gas, V is the velocity of gas, $g$ is the acceleration of gravity, P is the density of the carbon and $P_0$ is the density of gas. At a carbon to chromic oxide ratio of about 1:3.6 about 7.5 pounds of chromic chloride is produced in a typical operation per pound of carbon consumed. Therefore, $d_2$ would be about 0.030 or approximately 5 times the critical diameter of the carbon. The above empirical formula may be applied to establish operating conditions for a product containing less than 0.3% carbon, generally by setting C at a value less than 0.2. The more preferred operating conditions are obtained when C is between about 0.01 to 0.15.

In carrying out the invention the amount of carbon and chromic oxide employed may be approximately that amount theoretically required to convert the chromic oxide to chromic chloride with the formation of by-product carbon dioxide. However, it has been found that not only may an excess of carbon be employed but that the use of excess carbon is particularly desirable in providing the more preferred conditions and other distinct advantages of considerable importance. A particular benefit derived from the use of excess carbon is more rapid conversion of the chromic oxide to chromic chloride due to the increase in concentration of carbon in the reaction zone. An additional benefit which may be realized from employing excess carbon is production of even higher purity chromic chloride as the larger particles present in excess depreciate at a slower rate to the point where the carbon might carry over in the product stream. Another particular advantage found to be obtainable from the use of excess carbon is that carbon may actually be consumed to supply additional heating to the fluidized bed. Under the conditions of operation of the process the reaction forming the chromic chloride is exothermic but generally not self-sustaining due to heat losses and other factors inherent in the process. Consequently, additional heat is usually required and may be supplied in several ways. One method which may be employed is external heating of the fluidized bed. Another method involves the preheating of the reactants charged to the fluidized bed including the solids mixture as well as the gas introduced into the bed. However, it is preferable from a practical standpoint to supply at least some portion of the additional heat requirements by internal heating of the fluidized bed and it is often particularly desirable to supply the entire additional heat requirements by this method. Under the conditions of operation of the process involving the use of excess carbon it has been found that carbon may be subjected to combustive oxidation to internally supply any amount of additional heat desired. Despite this additional consumption of carbon within the bed the process may be carried out under regulated conditions to supply such additional heat without any substantial loss of purity of the chromic chloride product due to carbon contamination. The actual amount of carbon employed in relation to the chromic oxide may therefore be varied over a fairly wide range depending on the particular mode of operation desired. The theoretical ratio by weight of carbon to chromic oxide for production of chromic chloride is about 1:8.44. When an excess of carbon is to be employed the actual amount of carbon may vary considerably depending largely on the amount, if any, of heat to be supplied internally and the desirability of maintaining the more preferred operation conditions. When carbon is to be consumed for internal heating it is required that the carbon to chromic oxide ratio be at least about 1:7.0 to provide at least about a 20% excess of carbon over the stoichiometric requirement. In situations where less than approximately the major portion of the additional heat requirement is supplied by internal combustion of carbon or where no heat is to be so supplied the ratio of carbon to chromic oxide in the feed to the bed is preferably less than about 1:2.0, and desirably in the range of about 1:6 to 1:3.0. When all or the major portion of the additional heat requirements are supplied by internal combustion of the carbon the ratio of carbon to chromic oxide in the feed is preferably not greater than about 2:1, and desirably in the range of about 1:3 to 1.5:1. When carbon is consumed within the bed to supply heat internally gas volumes and thus gas velocities are increased to the higher ranges. Particle size of the carbon employed in such situations should be increased accordingly. When substantial amounts of heat are supplied internally a carbon particle size of between about 3–20 standard mesh is usually desirable. The use of excess carbon, under the more preferred conditions at equilibrium, provides a fluidized bed containing at least about 95% by weight carbon and highly efficient conversion of the chromic oxide with residence times of the chromic oxide being less than 2 minutes, usually less than 1 minute.

Excess carbon may be regulated by control of the composition of the solids mixture charged to the bed. Another method involves actually removing excess carbon from the bed which may be accomplished either continuously or periodically. One approach to removal of excess carbon is withdrawal from the lower section of the fluidized bed where the larger carbon particles tend to reside. When withdrawal is made from the bottom of the fluidized bed the material recovered is largely carbon with at most only minor portions of unreacted chromic oxide. The recovered carbon may be admixed with additional chromic oxide in the desired proportion and returned as part of the solids charged to the reaction zone. It has been found that particularly good results may be obtained when the excess unreacted carbon is withdrawn from an upper portion of the fluidized bed where the lighter weight more depreciated carbon particles are generally distributed. By withdrawing the carbon from the upper section of the bed it is possible to remove a substantial portion of the smaller carbon particles before they are depreciated by participation in the reaction to the point when the particles are carried over in the product stream. In this manner the process may therefore be carried out using a greater proportion of the larger carbon particles and the amount of carbon in the product reduced such that chromic chloride of even higher purity produced. When withdrawn from the upper portions of the bed the carbon is usually admixed with some unreacted chromic oxide. A further advantage in this approach is that the carbon particles may be withdrawn from the upper portions of the fluidized bed while the particles are still substantially greater in particle size than the chromic oxide. Thus, by withdrawing the carbon when the particles are say at least about twice the size of the chromic oxide particles it is possible to readily separate the carbon and chromic oxide by conventional methods such as scalping or screening. The unreacted chromic oxide may then be returned to the reaction zone after admixture with fresh carbon of larger size. Removal of excess carbon by withdrawal from the upper section of the fluidized bed gives particularly good results when bottom feeding is employed to introduce the solid reactants into the fluidized bed. The withdrawal of the solids from the upper section of the fluidized bed may be accomplished continuously or intermittently through discharge outlets in the side of the reactor or by other conventional methods including the use of reactors specifically designed to discharge solids from an upper portion of the fluidized bed.

Many of the readily available forms of chromic oxide which may be used in the process of the invention are of small and widely varying particle sie. As relative particle size of the carbon and chromic oxide is important it is desirable to have some method of control over the size and size distribution of the chromic oxide as well as the carbon, particularly in situations where the larger carbon particles of about 3–40 mesh size are to be employed. It has been found that this may be accomplished and particularly good results obtained by pelletizing the finer chromic oxide particles to obtain larger aggregate particles of chromic oxide. In this manner chromic oxide may be readily provided in a form having particle size between about 40 and 150 standard mesh, as desired, with good control over size distribution of the chromic oxide be easily realized. The preparation of the pelletized chromic oxide may be accomplished by any suitable method such as compaction and granulation.

In the more preferred embodiments of the invention temperature control within the fluidized bed may be readily effected in conjunction with internal heat, although the presence of excess carbon raises the possibility that a number of reactions takes place, as indicated by the following equations:

$$2Cr_2O_3 + 3C + 6Cl_2 \rightarrow 4CrCl_3 + 3CO_2 \tag{1}$$
$$2Cr_2O_3 + 6C + 6Cl_2 \rightarrow 4CrCl_3 + 6CO \tag{2}$$
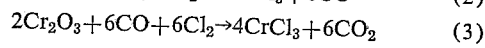
$$2Cr_2O_3 + 6CO + 6Cl_2 \rightarrow 4CrCl_3 + 6CO_2 \tag{3}$$

Also, the use of excess carbon to supply heat internally to the fluidized bed may give rise to a number of additional reactions represented by the equations:

$$C + O_2 \rightarrow CO_2 \tag{4}$$
$$2C + O_2 \rightarrow 2CO \tag{5}$$
$$2CO + O_2 \rightarrow 2CO_2 \tag{6}$$
$$CO_2 + C \rightarrow 2CO \tag{7}$$

It will be evident that some control over the above reactions may be made and that the particular reactions which predominate within the bed will influence several factors including composition of feed gas including oxygen requirements, speed of reaction, extent of exothermic reaction and heat requirements, and composition of the by-product, off-gas stream discharged from the reactor. The reaction given by the above Equation 1 which produces by-product carbon dioxide is the more exothermic reaction and also represents the more efficient utilization of carbon, the amount being only one-half of the carbon required to convert the chromic oxide according to the reaction of Equation 2 which produces by-product carbon monoxide. We therefore prefer to set carbon requirements in the feed mixture according to the requirements of Equation 1, and the excess carbon referred to herein is meant to be the excess over the amount for that reaction. The excess carbon present in the solids feed may also be combined with oxygen to supply heat internally in the fluidized bed according to the reactions of Equations 4, 5 and 6. It will be noted that the primary reactions (4) and (5) which form by-product carbon dioxide and carbon monoxide, respectively, are exothermic reactions which take place within the bed more or less depending on the amount of oxygen present. Under the more preferred conditions of operation we have found that both carbon dioxide and carbon monoxide are present in the off-gases from the reactor. It would be possible that the presence of carbon monoxide in the off-gases meant that substantial conversion of the chromic oxide had taken place by the reaction of Equation 2 while the carbon dioxide was produced by the combustion of excess carbon within the bed. Also, the presence of carbon monoxide and carbon dioxide might indicate that substantial conversion of the chromic oxide proceeds according to the reaction of Equation 3. While we do not choose to be limited by any theory of reaction it is believed that the chromic oxide is primarily converted to chromic chloride by the reaction of Equation 1, and, to a much less extent by the reaction of Equation 2 in so far as the carbon monoxide in the gas stream is concerned. We base our conclusion on several factors including reaction rates, heat requirements and oxygen content of the off-gas. First of all, the reaction of Equation 3, based on our experimentation is much slower than the reactions of Equations 1 and 2, and the latter reactions much more closely approximate the reaction rates of the process of the invention which are particularly rapid. Residence time of the chromic oxide in the reaction zone is generally very short, being usually about less than 2 minutes, more usually less than about 1 minute. Also the reaction of Equation 2 is the less exothermic when compared to reaction (1). Generally, the heat generated in the process of the invention more closely approximates that of Equation 1 in which the carbon is converted to carbon dioxide. The production of carbon monoxide in the presence of excess carbon by reaction of Equation 7 may also account for at least some portion of this material in the gas stream. Generally, in the more preferred forms of practice, the amount of carbon present is in excess of that required to provide for internal heating after provision for conversion of the chromic oxide. The combustion of carbon with oxygen according to the reactions of Equations 4 and 5 differs considerably in the amount of heat liberated. Per mol of carbon the reaction of Equation 4 which forms carbon dioxide yields some 3 times the amount of heat as the reaction of Equation 5 which forms carbon monoxide. As the exent to which these reactions take place depends on the amount of available oxygen it will be evident that the desired temperatures within the bed may be controlled by regulation of the amount of oxygen introduced into the fluidized bed. Thus, regulation of oxygen feed to the fluidized bed provides a convenient method of controlling temperature conditions while simultaneously supplying the heat necessary to maintain the required temperature conditions. Depending upon operating conditions the amount of oxygen may be varied considerably within the range of about 0 to 1 mol of oxygen per mol of carbon charged. Desirably, the amount of oxygen is usually maintained below that amount which causes any substantial release of oxygen from the fluidized bed to provide a wide margin of control of the reaction and to suppress undesirable side reactions.

Chlorine and oxygen are the required constituents of the gas stream introduced into the lower portion of the reactor to maintain the fluidized bed and provide heat internally. In practice, the composition of the feed gas as well as the amounts of chlorine and oxygen may be widely varied depending upon desired operation conditions and the requirement for maintaining the solids reactants in the fluidized state above the incipient fluidization velocity of the bed. The oxygen introduced into the reactor may be commercial oxygen or supplied from ordinary air. When employing ordinary air, nitrogen and other inerts in the air act as diluents. If the amount of oxygen supplied by the air is less than desired, it may be readily made up by the addition of oxygen from other sources, such as commercial oxygen. If the amount of oxygen supplied by the use of ordinary air exceeds requirement, the desired level may be easily obtained by addition of diluents such as nitrogen or carbon dioxide. A preferred gas composition found to give good results contains chlorine, oxygen, and nitrogen.

The following examples in which percentages are by weight demonstrate the practice and advantages of the present invention.

*Example 1*

Chromic chloride was prepared by reaction of chromic oxide with carbon and chlorine in a 2 inch diameter Vycor reactor having height of about 40 inches and equipped with a 1 inch inlet at the bottom and a 1 inch outlet 4" from the top. A 1 inch inlet for introduction of solids was located at the top. The chromic oxide employed was finely divided metallurgical grade with an ultimate particle size of 1–3 microns. The chromic oxide particles were admixed in a conical mixer with coarse coke having a particle size about 95% plus 20 mesh and about 100% plus 40 mesh. Ratio by weight of coke to chromic oxide was about 1 to 3.6. The mixture contained coke in about 135% excess of the amount theoretically required to convert the chromic oxide to chromic chloride based on the formation of by-product carbon dioxide. Over the course of about 6½ hours the mixture of coke and chromic oxide was continuously fed to the Vycor reactor at an average rate of about 203 grams per hour. A fluidized bed weighing at equilibrium about 250 grams and having an average height of about 5 inches was maintained by the introduction of gas at the lower portion of the Vycor reactor. The gas employed to maintain the fluidized bed was composed of about 68% chlorine and 32% nitrogen by volume. The gas was prepared by mixing of chlorine gas with nitrogen in a weight ratio of about 84:16. The rate of gas feed to the reactor was about 1.0 lbs. per hour with the average gas velocity through the bed being about 0.241 ft./sec. The chlorine gas introduced into the bed represented an excess of about 19% over the theoretical required for conversion of the chromic oxide to chromic chloride. The reaction temperature in the fluidized bed was regulated at about 925° C. by external heating of the Vycor reactor. Reaction temperature was measured by the use of thermocouples located along the exterior wall of the reactor, and represented the average temperature of the fluidized bed. Excess carbon was observed to build up in the lower portion of the fluidized bed and was withdrawn periodically through a 1 inch diameter outlet in the lower portion of the reactor. The average rate of withdrawal was about 21 grams per hour. Nitrogen was also introduced at a rate of about 0.5 standard cubic feet/hour through the top feed tube to prevent condensation of $CrCl_3$ and consequent plugging of the feed tube. From the discharge outlet at the top of the reactor there was continuously discharged about 1.3 lbs. per hour of a gas stream containing chromic chloride vapor along with extraneous gases including chlorine, nitrogen, carbon dioxide and less than about 0.6% oxygen. The volatile chromic chloride was condensed in a nickel condenser by air cooling. Weighing the solid product showed that chromic chloride was formed at a rate of about 255 grams per hour. Chlorine utilization within the bed was about 84%. Analysis of the condensed product showed the chromic chloride to be of a high 99.12% purity with only about 0.12% carbon and only about 0.7% unreacted chromic oxide with the remaining 0.06% largely made up of trace amounts of moisture.

*Example 2*

Chromic chloride was prepared by reaction of chromic oxide with carbon and chlorine in a 2 inch diameter Vycor reactor having height of about 40 inches and equipped with a 1 inch inlet at the bottom and 1 inch outlet 4″ below the top. A 1 inch inlet for introduction of solids was located at the top. The chromic oxide employed was finely divided metallurgical having a particle size of 1–3 microns. The chromic oxide particles were admixed in a conical mixer with coarse coke having a particle size of 95% plus 20 mesh and about 100% plus 40 mesh. Ratio by weight of coke to chromic oxide was about 1 to 3.6. The mixture contained coke in about 135% excess of the amount theoretically required to convert the chromic oxide to chromic chloride based on the formation of by-product carbon dioxide. Over the course of about 7 hours the mixture of coke and chromic oxide was continuously fed to the Vycor reactor at an average rate of about 192 grams per hour. The fluidized bed of reactants containing about 400 grams of carbon and having an average height of about 7 inches was maintained by the introduction of gas at the lower portion of the Vycor reactor. The gas employed to maintain the fluidized bed was composed of about 64% chlorine and 36% oxygen. The gas was prepared by mixing of chlorine gas with oxygen in a weight ratio of about 78.6 to 21.4. The rate of gas feed to the reactor was about 0.72 lb. per hour with the average gas velocity through the bed being about 0.247 ft./sec. The chlorine gas introduced into the bed represented an excess of about 12% over the theoretical required for conversion of the chromic oxide to chromic chloride. The reaction temperature in the fluidized bed was regulated at about 950° C. by external heating of the Vycor reactor and by burning of excess coke within the bed. The coke was consumed within the bed to supply heat internally at a rate of about 38 grams per hour. Excess carbon was burned at essentially the same rate as charged, hence no withdrawals were necessary. A material balance shows a loss of about 88 grams of carbon from the 400 gram bed. About 25% of the required heat input was derived from burning carbon. Reaction temperature was measured by the use of thermocouples located along the exterior wall of the reactor and represented the average of conditions in the fluidized bed. Nitrogen was also introduced at a rate of about 0.5 standard cubic feet/hour through the top feed tube to prevent condensation of $CrCl_3$ and consequent plugging of the feed tube. From the discharge outlet at the top of the reactor there was continuously discharged about 0.97 lb. per hour of a gas stream containing chromic chloride vapor along with extraneous gases including chlorine, carbon dioxide, carbon monoxide, and less than about 0.7% oxygen. The volatile chromic chloride was condensed in a nickel condenser by atmospheric cooling. Weighing the product showed that chromic chloride was formed at a rate of about 288 grams per hour. Chlorine utilization within the bed was about 89%. Analysis of the condensed product showed the chromic chloride to be of a high 98.5% purity with only about 0.18% carbon and only about 0.19% unreacted chromic oxide with the remaining 1.13% made up mainly of absorbed moisture.

*Example 3*

Chromic chloride was prepared by reaction of chromic oxide with carbon and chlorine in the fluidized state in a 2 inch diameter Vycor reactor having a height of about 40 inches and equipped with a 1 inch inlet at the bottom and 1 inch outlet 4″ from the top. A 1 inch inlet for introduction of solids was located at the top. The chromic oxide employed was in the form of pelletized particles having a screen analysis such that about 94% was minus 50 mesh and about 96% plus 200 mesh. The pelletized particles had an average density of about 95 lbs. per cu./ft. and were prepared from pigment grade chromic oxide by consolidating with an organic binder. The chromic oxide pellets were admixed in a conical mixer with coarse coke having a particle size of about 95% plus 20 mesh and about 100% plus 40 mesh. The average particle size of the coke was about 7.2 times the average particle size of the chromic oxide pellets. Ratio by weight of coke to chromic oxide was about 1 to 3. The mixture contained coke in about 181% excess of the amount theoretically required to convert the chromic oxide to chromic chloride based on the formation of by-product carbon dioxide. Over the course of about 12 hours the mixture of coke and chromic oxide was continuously fed to the Vycor reactor at an average rate of about 192 grams per hour. The fluidized bed of the reactants weighing at equilibrium about 250 grams and having an average height of about 5 inches was maintained by the introduction of gas at the lower portion of the Vycor reactor. The gas employed to maintain the fluidized bed was composed of about 66% chlorine and 34% oxygen. The gas was prepared by mixing of chlorine gas and oxygen in a weight ratio of about 81 to 19. The rate of gas feed to the reactor was about 0.70 lb. per hour with the average gas velocity through the bed being about 0.237 ft./sec. The chlorine gas introduced into the bed represented an excess of about 42% over the theoretical required for conversion of the chromic oxide to chromic chloride. The reaction temperature in the fluidized bed was regulated at about 925° C. by external heating and by burning of excess coke within the bed. The coke was consumed within the bed to supply heat internally at a rate of about 50 grams per hour. Reaction temperature was measured by the use of thermocouples located along the exterior wall of the reactor and represented the average temperature of the fluidized bed. Nitrogen was also introduced at a rate of about 0.5 standard cubic feet/hour through the top feed tube to prevent condensation of $CrCl_3$ and consequent plugging of the feed tube. From the discharge outlet at the top of the reactor there was continuously discharged about 1.00 lb. per hour of a gas stream containing chromic chloride vapor along with extraneous gases including chlorine, carbon dioxide, carbon monoxide, and less than about 0.6% oxygen. The volatile chromic chloride was condensed in a nickel condenser by atmospheric cooling. Weighing the product showed that chromic chloride was formed at a rate of about 279 grams per hour. Chlorine utilization within the bed was about 70%. Analysis of the condensed product showed the chromic chloride to be of high 99.4% purity with only about 0.12% carbon and only about 0.4% unreacted chromic oxide with the remaining 0.08% made up mainly of absorbed moisture. Excess carbon was completely consumed, hence no removal of carbon from the fluidized bed was necessary.

Although certain preferred embodiments of the invention have been disclosed for purpose of illustration, it will be evident that various changes and modifications may be made therein without departing from the scope and spirit of the invention.

We claim:

1. The process for production of high purity chromic chloride which comprises subjecting chromic oxide essentially free of other chloride forming metals to reaction in the fluidized state with a gas containing at least a 10% excess of chlorine and with at least a 20% excess (based on formation of by-product carbon dioxide) of carbon having a particle size at least 5 times greater than the particle size of at least 80% of the chromic oxide, the rate of gas flow being regulated to provide a superficial velocity between 60–400% above the incipient fluidization velocity of the fluidized reactants, at a temperature regulated above about 920° C. to convert the chromic oxide by reaction with the chlorine and carbon to chromic chloride.

2. The process of claim 1 in which the temperature is regulated within the range of about 925° C. to 960° C. and the superficial velocity is between about 80–200% above incipient fluidization velocity.

3. The process of claim 1 in which the chlorine is present in an excess of about 10–50%.

4. The process of claim 1 in which the carbon has initially a particle size 8 to 20 times the particle size of the chromic oxide.

5. The process of claim 1 in which the particle size of carbon is initially about 5–40 standard mesh.

6. The process for production of high purity chromic chloride which comprises maintaining a fluidized bed of reactants including chromic oxide and carbon, adding to said bed carbon and chromic oxide essentially free of other chloride-forming metals and having particle size relative to each other such that the particle size of the carbon is at least 5 times greater than the particle size of at least 80% of the chromic oxide, the amount of carbon and chromic oxide in the feed to the fluidized bed being regulated such that the ratio by weight of carbon to chromic oxide is within the range of 1:7 to 2:1 to provide excess carbon in the bed over the amount theoretically required to convert the chromic oxide to chromic chloride with formation of by-product carbon dioxide, introducing into said fluidized bed a gas containing oxygen and at least about a 10% excess of chlorine over the amount theoretically required to form chromic chloride from the chromic oxide, the rate of gas flow through said bed being regulated to provide a superficial velocity between 60–400% above the incipient fluidization velocity, heating said fluidized bed of reactants internally by combination of oxygen with carbon to a temperature of at least about 920° C. to convert chromic oxide by reaction with the chlorine and carbon to volatile chromic chloride, releasing the volatile chromic chloride from said fluidized bed, and recovering high purity chromic chloride.

7. The process of claim 6 in which the chlorine excess is between about 10–50% and the superficial gas velocity is between about 80–200% above the incipient fluidization velocity.

8. The process of claim 6 in which the carbon particles in the feed have a size of about 5–40 Tyler Standard Mesh.

9. The process of claim 6 in which the carbon in the feed has a particle size 8 to 20 times the particle size of the chromic oxide.

10. The process of claim 6 in which the reaction temperature is between about 925–960° C.

11. The process of claim 6 in which the particle size of the carbon is between 3–20 Tyler Standard Mesh and the chromic oxide between 50 and 150 Tyler Standard Mesh.

12. The process of claim 6 in which the chromic oxide is in the form of pelletized particles having an average bulk density between 80–120 lbs./cu. ft.

13. The process of claim 6 in which the carbon excess is regulated by withdrawing carbon from the fluidized bed.

14. The process of claim 6 in which the carbon is withdrawn from the lower portion of the fluidized bed.

15. The process of claim 6 in which the carbon is withdrawn from the upper portion of the fluidized bed along with unreacted chromic oxide.

16. The process of claim 6 in which carbon represents at least about 95% by weight of the solid reactants in the fluidized bed.

References Cited by the Examiner

UNITED STATES PATENTS

| 2,133,998 | 10/1938 | Maier | 23—87 X |
| 2,752,301 | 6/1956 | Cooper | 23—87 X |
| 2,985,507 | 5/1961 | Wienert | 23—87 |

FOREIGN PATENTS

| 865,939 | 4/1961 | Great Britain. |
| 897,904 | 5/1962 | Great Britain. |

OTHER REFERENCES

Chem. Eng., April 1955, pages 189 and 190.

OSCAR R. VERTIZ, *Primary Examiner.*

EDWARD STERN, *Examiner.*